Figure 1:
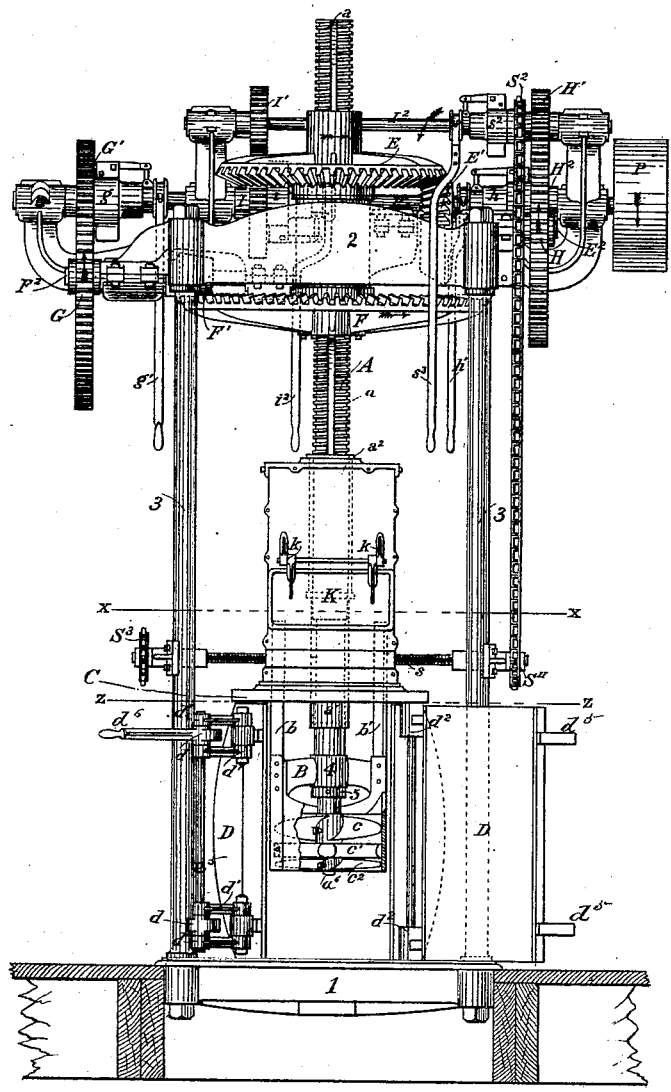

(No Model.)　　　　　S. T. LOCKWOOD.　　5 Sheets—Sheet 1.
BRAN PACKING MACHINE.

No. 434,669.　　　　　Patented Aug. 19, 1890.

WITNESSES:
A. M. Williamson
H. A. Hansen

INVENTOR
Saml. T. Lockwood
BY
D. N. McInture
ATTORNEY

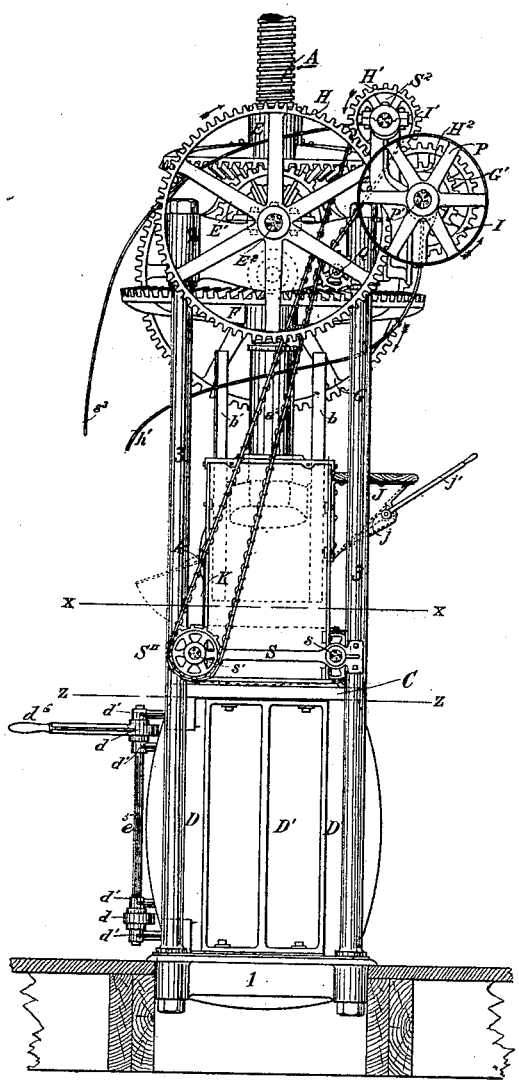

(No Model.) 5 Sheets—Sheet 3.
S. T. LOCKWOOD.
BRAN PACKING MACHINE.
No. 434,669. Patented Aug. 19, 1890.
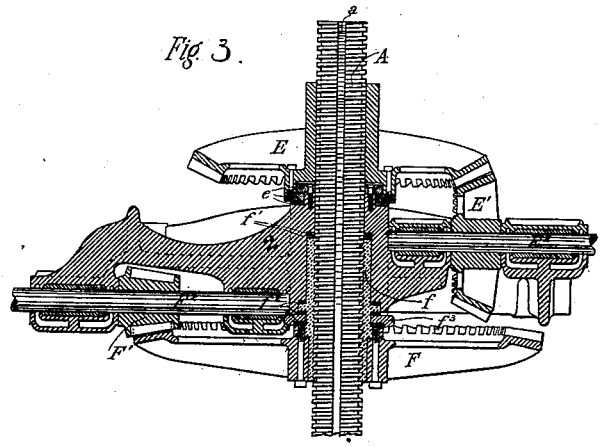
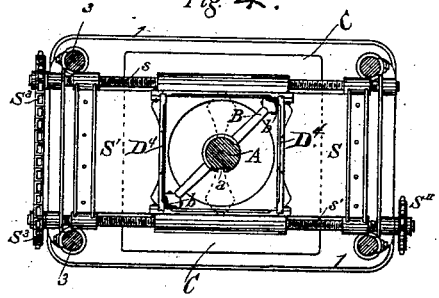 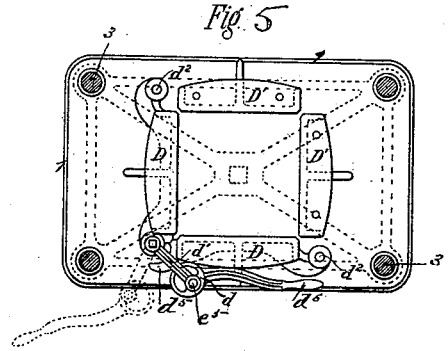
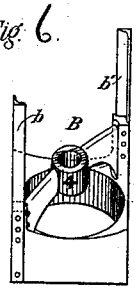 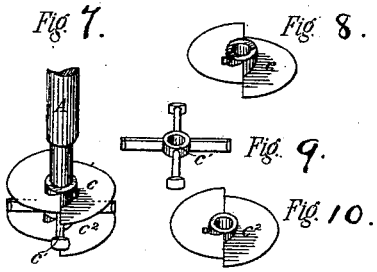
WITNESSES:
A. M. Williamson
H. T. Hansen
INVENTOR
Saml. T. Lockwood
BY
J. N. McIntire
ATTORNEY (No Model.) 5 Sheets—Sheet 4.
S. T. LOCKWOOD.
BRAN PACKING MACHINE.
No. 434,669. Patented Aug. 19, 1890.
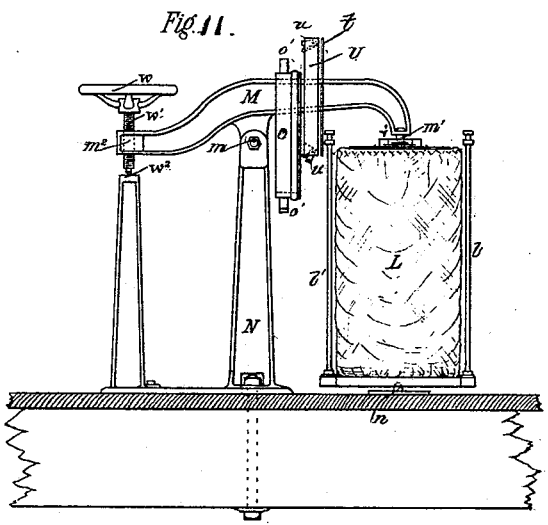
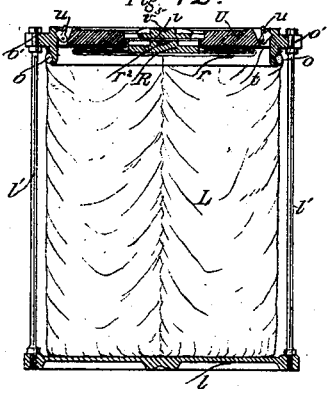
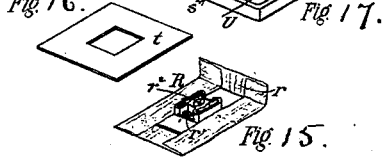
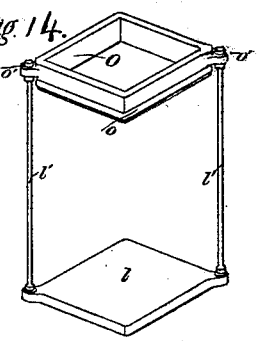
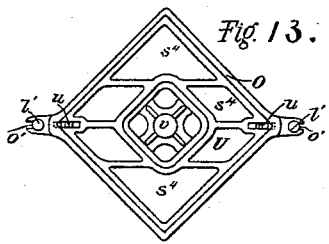
WITNESSES:
A. M. Williamson
H. N. Hansen
INVENTOR
Saml. T. Lockwood
BY J. N. McIntire
ATTORNEY (No Model.) 5 Sheets—Sheet 5.
S. T. LOCKWOOD.
BRAN PACKING MACHINE.
No. 434,669. Patented Aug. 19, 1890.
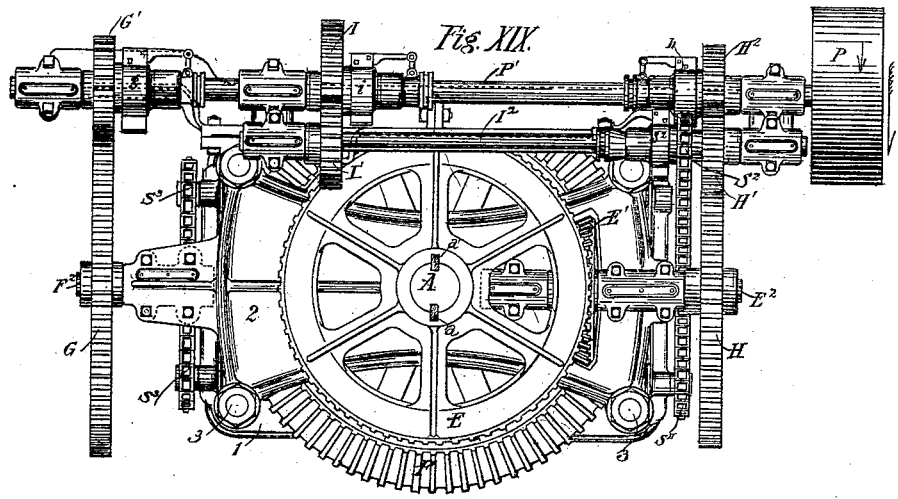
Fig. XIX.
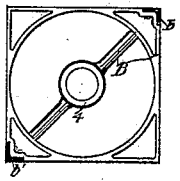
Fig. XX.
WITNESSES:
A. M. Williamson.
H. A. Hansen.
INVENTOR
Saml. T. Lockwood
BY
J. N. McIntire
ATTORNEY

UNITED STATES PATENT OFFICE.

SAMUEL T. LOCKWOOD, OF CHICAGO, ILLINOIS.

BRAN-PACKING MACHINE.

SPECIFICATION forming part of Letters Patent No. 434,669, dated August 19, 1890.

Application filed July 29, 1889. Serial No. 319,086. (No model.)

*To all whom it may concern:*

Be it known that I, SAMUEL T. LOCKWOOD, of Chicago, in the county of Cook and State of Illinois, have invented new and useful Improvements in Bran-Packing Machines, which may be used for packing other articles or materials; and I do hereby declare that the following is a full, clear, and exact description thereof, reference being had to the accompanying drawings, forming part of this application.

My present invention relates more especially to that type or species of machine or contrivance for packing bran and other materials within suitable bags or receptacles in which devices are employed for first packing the material into the bag, as supplied, to fill the latter, and subsequently compressing the material within the bag or receptacle by means of press-like devices, although the novel constructions devised by me may be separately used with more or less advantage in separate machines adapted, one to perform only the operation of filling a bag by packing the material into it by feeding or filling devices and the other to compress within the bag or receptacle a charge of material previously placed within said bag.

To enable those skilled in the art to which my invention relates to understand and practice the same, I will now proceed to more fully describe the several features of my invention, referring by letters to the accompanying drawings, which form part of this specification, and in which I have shown my improvements carried out in that form of machine into which I have preferably incorporated them, and in the form in which I have so far successfully practiced my invention.

In the accompanying drawings, Figure 1 is a front elevation of my improved machine represented as having the front door of the bag-retaining receptacle or packing-box thrown open, and with a portion of the plunger cut away, in order to present a partial sectional view thereof. Fig. 2 is a side elevation of the machine. Fig. 3 is a partial vertical section, on a slightly enlarged scale, showing more particularly the upper portion or ing beam, also the nut therein located, through which the vertical screw-shaft passes, and the gears employed to rotate said nut and to turn said screw-shaft. Fig. 4 is a horizontal section at the line $x\ x$ of Fig. 1, the plunger in this view being in the position which it occupies in Fig. 1. Fig. 5 is a horizontal section at the line $z\ z$ of Fig. 1, the plunger in this view being supposed to be elevated above the plane of section, and hence not visible. Fig. 6 is a detail perspective view of the plunger, which is carried on the lower end of the screw-shaft, and within which work the devices for packing the material. Fig. 7 is a detail view of the lower end of the screw-shaft, together with the helical packing devices thereon in perspective. Fig. 8 is a perspective view of the upper one of the auger-like packing devices detached from the screw-shaft. Fig. 9 is a view in perspective of a device which is located between the two helical packing devices of the screw-shaft. Fig. 10 is a perspective view of the lower auger or helical packing device detached from the shaft. Fig. 11 is a side view or elevation of the supplemental machine or contrivance used for holding the filled package after the removal of the same from the packing and compressing machine shown in the preceding figures, and showing such filled package held in the proper manner to permit the fastening in place of the bag-cover. Fig. 12 is a vertical section, taken on a plane passing diagonally through it, of the bag-holder or case, together with a bag arranged therein and the parts used in connection therewith, said figure being drawn on an enlarged scale in order to better show the minor parts. Fig. 13 is a top view of the bag-holder and other parts seen at Fig. 12 and drawn on the same scale as the last-named figure. Fig. 14 is a perspective view of the bag-holder detached and in condition or position to receive a bag. Fig. 15 is a perspective view showing the lower portion of the platen, together with a partially-folded cloth-cover. Fig. 16 is a perspective view of that part of the platen-like portion of the machine which is located on or immediately over the device seen at Fig. 15, when all the parts of the platen-like device have been put together. Fig. 17 is a perspective view of another part or portion of the platen-like device that is placed in assembling the parts of the platen over the part seen at Fig. 16, and Fig. 18 is still another portion or device of the platen shown in perspective.

Fig. 19 is a top view of the whole machine on a slightly-enlarged scale; and Fig. 20 is a bottom view, on an enlarged scale, of the parts seen in perspective at Fig. 6.

In the several figures of the drawings the same part wherever it is visible will be found represented by the same letter of reference.

The frame of the machine represented in the drawings and containing the several features of my invention consists of a base 1, a top beam or portion 2, and four heavy rods or pillars 3, which connect and hold rigidly and firmly in their respective places the said base and top portions, as clearly illustrated.

A is a screw-shaft having one or more longitudinal grooves $a$ for receiving a feather or feathers in the hub of the beveled gear E, by which gear it is rotated and through the hub of which it freely moves longitudinally. The said screw-shaft, near its lower end, passes through the hub-like portion 4 of the arch of the plunger B, and below said hub carries the augers $c$ and $c^2$, and also a device $c'$, (represented in perspective at Fig. 9,) that, as seen at Figs. 1 and 7, is located between the two auger-like devices.

The plunger or case B, in which the packing devices operate, is retained on the screw-shaft A by a collar 5, that is arranged below the hub-like portion 4 of the plunger, and within said portion 4 the said screw-shaft rotates freely. This plunger has a circular opening below its arch, within which rotate the packing-augers $c$ and $c^2$, and to the walls of said opening are bolted two of the arms of a device $c'$, the construction and function of which device will be presently explained. This plunger, as represented, is square in cross-section exteriorly, though it may be of other polygonal shape or round to conform to whatever may be the shape of the packing-case and the intended shape of packages, and it has guides $b$ and $b'$ to prevent it from rotation with the screw-shaft A when it is below the line $z\ z$ and it is not otherwise held against a rotary motion. The screw-shaft A passes through a screw-threaded nut $f$, (see Fig. 3,) which rotates freely in the beam or upper part 2 of the frame of the machine, and said nut is bolted rigidly to the beveled gear F and has a flange $f^2$, which rests upon a split ring $f^3$, the parts of which latter are bolted firmly to said beam, that thus supports the weight of the nut $f$ and its gear F, as also that of the screw-shaft A and its appendages. The upward thrust of this nut while working is received by an offset in the beam 2 at $f'$, between which and the nut several thin steel washers are employed, as illustrated, to diminish friction. It will thus be seen that the screw-shaft A and nut $f$ can be rotated each independently of the other or both together, or one in one direction and the other in the other, whereby I am enabled to secure various degrees of speed and power in operation.

In my improved machine, as represented, I have provided by well-known mechanical means for the rotation of the screw-shaft in either direction and for the rotation of the nut in only one direction, as will presently appear. To secure these motions I use one belt only, driving the pulley P in the direction indicated by the arrow thereon. On the shaft P′ of said pulley are gears $H^2$ and I, provided with clutches $h$ and $i$, having, respectively, handles $h'$ and $i^2$, and the said gears engage with the gears H′ and I′, respectively. Now, when the gear $H^2$ is clutched to its shaft, the gear H′ turns in the opposite direction, as indicated by the arrow thereon, and the gear H and the beveled gear E′ being keyed to the same shaft, the latter, which engages the beveled gear E, turns it in the direction indicated by the arrow on its hub, which latter being splined to the screw-shaft A, will turn it (its nut being at rest) in the proper direction to raise the said shaft. This motion is employed in packing, as will be hereinafter explained. By opening the clutch to gear $H^2$ and closing that to gear I, the gears I′ and H′, which are keyed to the shaft $I^2$, rotate in a direction opposite to that of the pulley P, and as the gear H′ engages the gear H the latter turns in the same direction as pulley P, from all of which it will be readily seen that the screw-shaft A will turn in the right direction to move downward through its nut $f$ in the beam 2. In each of these cases there will be a back-drive from the gear H to the unclutched gear on the shaft P′. On the shaft P′ is also the gear G′, with its clutch $g$ and handle $g'$, the said gear engaging the gear G, and when this clutch $g$ is closed the gear G will rotate in the direction indicated by the arrow thereon, and the gear G and the beveled pinion F′ being keyed to the same shaft and the latter being in engagement with the beveled gear F, which is rigidly bolted to the nut of the screw-shaft A, as before described, the gear F will turn in the direction indicated by the arrow thereon, and this motion of the nut $f$ will move the screw-shaft A downward with great force, and hence this motion I employ for the final compression of each package. It will readily be seen that the clutch $g$ and either of the clutches $h$ or $i$ can be used at the same time if for any reason it shall be desirable, thereby driving both the nut $f$ and the screw-shaft A at the same time. When either the screw-shaft A or nut $f$ is driven alone, the part not driven must be held by some simple form of brake applied either to the gears H or G or to the beveled gears E or F.

I have thus described the means which by preference I employ for rotating the screw-shaft A in opposite directions and its nut $f$ in one direction; but any other known means may of course be employed for thus driving these working parts of the machine.

After having packed in the requisite amount of material (or nearly all of it) for a package by the use of the devices attached to the lower end of the screw-shaft A, as will be presently described, and before finally compressing the packed-in material, I have found it necessary to cut through the material just below the plunger, and to confine temporarily the packed material below this cut-off, for reasons which will hereinafter appear. To thus cut off and confine the packed bran or other material, I employ two thin plates of sharpened steel S and S', Fig. 4, having bearings to which they are riveted, and which are provided at their ends with nuts to work upon the right and left screw-rods $s$ and $s'$. These threaded rods are made to rotate together uniformly by means of the sprocket-wheels $S^3$ $S^3$ and a chain-belt connecting them, as clearly shown in Fig. 19. The screw-rod $s'$ is rotated by means of the sprocket-wheels $S''$ and $S^2$, one of which, as seen, is on the shaft $I^2$, and is provided with a clutch $s^2$ and clutch-handle $s^3$, and when this clutch is closed all of these sprocket-wheels and the right and left screw-rods $s$ and $s'$ are driven in the same direction that the shaft $I^2$ may at that time be rotating. As the shaft $I^2$ rotates by the back-drive of gear H in the direction opposite thereto, the right and left screws $s$ and $s'$ are so threaded that at this time, the clutch $s^2$ being closed, the knives S and S' will be driven in, and will cut through the packed material, and will also prevent all that portion below said knives from rising by expansion, and this takes place while the screw-shaft A is still rotating and moving upward, and hence only a small amount of material will be deposited above said knives, the supply having previously been shut off, as will presently appear. When the direction of the screw-shaft is reversed to move downward, the direction of the shaft $I^2$ will be reversed, and by closing the clutch $s^2$ the knives will be withdrawn. Care must be taken to open clutch $s^2$ promptly when the knives shall have traveled the proper distance either way.

I have thus described briefly in detail all of the working parts of the machine, and will now describe the construction of the reservoir or packing-case for receiving the bran or other loose material to be packed, said case having strong walls below, within which the packages are finally compressed, and which can be readily opened to admit a bag or other receptacle for holding the compressed material, with appliances for holding said bag in a proper position to be filled, and also for removing the compressed package.

D D, Figs. 1, 2, and 5, represent two strong walls hinged at $d^2$ $d^2$, so as to swing away and fully expose at two adjacent sides the space within which the package is formed. D' D' are two walls similarly constructed, but which are bolted rigidly to the base 1 of the frame, as shown in Fig. 2. When the doors D D are closed, the means for holding them firmly in their places are shown as consisting of the lugs $d^5$ on one of the doors, the links $d'd'd'd'$ hinged to the other door and the cams $d\,d$, one of which is supplied with a handle $d^6$, as represented, by which both are operated, being keyed to the same shaft (lettered $e^5$). By this means of holding the doors D D in a closed condition I am enabled, it will be seen, to draw them home to the proper positions and there securely lock them, practically, against the thrust of the material under pressure within the bag, while at the same time no complex fastening mechanism is employed, and the securing-cams $d\,d$ are most conveniently and easily operated by means of the single hand-lever $d^6$. These four walls, which do not meet at the corners, for reasons which will presently appear, as shown in Fig. 5, inclose the space in which a package is compressed, and they are placed so as to leave a space of about one-half an inch between their inside surfaces and the outer sides of the plunger when the plunger is down, as shown in Fig. 1, for reasons which will hereinafter appear.

Immediately above the four walls is a strong rectangular piece C, having a central opening the size and shape of the plunger, and which is rigidly bolted to the tops of the walls D' D'. Above the piece C are lighter walls $D^4$, having their inside surfaces arranged to meet the sides of the plunger when it rises therein to the position shown in Fig. 2, and this upper part of the reservoir has an opening for receiving a bran-spout J, which is provided with a cut-off $j$, also a door K, with any suitable means for fastening the same. This reservoir is provided with a cover bolted thereto, having a central opening for the screw-shaft. I also cover the threaded part of the screw-shaft within the reservoir with telescoping tubes $a'$ and $a^2$, (see Figs. 1 and 2,) for preventing the bran or other material, when the reservoir is filled, from coming into contact with and adhering to the oiled surface of said screw-shaft. These telescoping tubes rise with the screw-shaft from the position in which they are shown at Fig. 1 to that in which they are shown in Fig. 2, the section of the telescopic tubes marked $a'$ rising within the tube $a^2$, during the first half of the plunger's ascent, from the position shown at Fig. 1 to that shown at Fig. 2, and the two tubes then ascending together during the rest of the ascending movement of the plunger into the position in which the outer one $a^2$ is seen at Fig. 2.

The devices for holding the bag or receptacle for the material to be packed in (see Fig. 14) consist of a bottom plate 1, made to rest on the bed of the packer and compressor, in size filling the area inclosed by the walls D D and D' D', Fig. 5, these walls being cut away at the bottom at diagonally-opposite corners to accommodate the lugs in which the rods $l'$ $l'$ are set, which rods rise in the open corners between said walls and likewise at the top for the reception of the lugs $o'$ $o'$ of the piece O, which is the bag-holder proper, and the outside dimensions of which are the same as those of plate 1, while the inside opening is made to fit the plunger B. As heretofore stated, these walls D D and D' D' do not quite meet at their adjacent corners. One object in having the open spaces thus formed is to afford accommodation at two diagonally-opposite vertical corners of the packing-case for the rods $l'$ $l'$, and another is to afford at the other two corners free vents for the escape of air from within the bag and the mass of bran while the latter is being compressed. The rods $l'$ $l'$ are rigidly set in the plate 1, but are provided with shoulders below the lugs $o'$ $o'$ and heads above, and may be sprung out of the slots in lugs $o'$ $o'$ (shown in Fig. 13) to release the bag-holder O.

Around the bag-holder O is a rubber ring $o$, made of round rubber and lying in a recess deep enough to receive about half its volume, as shown in Fig. 12, though some other form of holding device may be used, of course, in lieu of the one shown.

The bags or receptacles for the material to be packed in should be made with square bottoms the size of the plate 1, and their height should be not less than the distance from plate 1 to the top of the lugs on the corners of the bag-holder O.

In operating the machine thus described, I first put the bag-holder O upon the rods $l'$ $l'$, as shown in Fig. 14, and then draw the top of the bag over the lower part of the bag-holder and over the rubber ring thereon, the bottom of the bag resting on plate 1 and fitting the same, corner to corner. If the bag should be a trifle too large to be held by its tension over the ring $o$, it may be held in place by a hook at one of the corners or in any other convenient way. The entire frame, Fig. 14, containing the bag is then placed upon the bed of the press under the plunger, (the bottom of which is at the time above the line $z$ $z$,) and the doors D D are then closed and fastened. The closing of these doors produces a pressure upon the rubber ring $o$ on all sides, between which and the walls D D and D' D' the top of the bag is firmly gripped. By closing clutch $i$, or $i$ and $g$ both, if desired, the screw-shaft is then lowered rapidly till the bottom of the plunger within the bag nearly touches its bottom resting on plate 1, when the clutch or clutches are opened to arrest the downward motion of the plunger. The spout J is then opened, through which the bran or other material flows, and the clutch $h$ is immediately thereafter closed. This causes the screw-shaft and the augers $c$ and $c^2$ thereon to rotate, by which process the material feeds first through auger $c$ and is compressed thereby against the auger $c^2$, where it is kept from partaking of the rotary motion of the augers by the device $c'$, which, as will be best seen by reference to Figs. 7 and 8, comprises a series of radially-arranged arms extending from its central hub to the inner wall of the cylindrical portion of the packer-plunger, each of the said radial arms possessing flat and vertically-arranged sides which operate to prevent the material from moving in a helical direction, or, in other words, force the material to move vertically while being compressed. The material feeds then through the auger $c^2$, by which it is compressed still more into the space below the plunger. The pitch of auger $c$ is much coarser than that of auger $c^2$, and I have found that by this combination of parts I can secure a much better result in packing, both as to the extent and rapidity of the compressive action, than has ever been secured by any other means. The principal object of the device $c'$ being to prevent the rotation of material between the augers, the essential parts of this device are the arms formed with flat or plane sides arranged in vertical planes, secured, by attachment to the walls of the plunger, against any rotatory movement, and extending, as shown and described, from the inner wall of the cylindrical part of said plunger toward the axis of the plunger-shaft. The hub may be omitted, leaving the arms without a central connection, and one only or more may be employed.

In a machine of the precise construction shown the plunger rises positively, according to the pitch of the thread upon the screw-shaft, and the pressure upon the material being packed depends upon the quantity fed through the auger $c$ and $c^2$ into the space below.

As other means may be employed for resisting the separation or recession the one from the other of the bottom of a bag or other receptacle, and a plunger containing similar devices to those shown, and while such devices are being operated therein, substantially as described, I do not limit myself to this construction, but design using whatever means by which these devices may be operated and may be made to compress materials into a bag or other receptacle. This process of packing continues, and as soon as the bottom of the plunger is above the plane of the knives S and S' the clutch $s^2$ should be closed, for reasons hitherto given, without opening clutch $h$, the spout J having previously been closed, and care being taken to open clutch $s^2$ as soon as the edges of the knives shall have met. The plunger continues to travel upward till its bottom end is above the line $x$ $x$, when clutch $h$ should be opened, and the process of packing by means of the augers is completed. The door K should then be opened for the insertion of the platen under the plunger and above any material that may have been deposited above the knives S S'. This platen comprises, in the aggregate, the several separable parts shown at Figs. 15 to 18, inclusive, (each of which will be hereinafter described,) and is adapted to hold the folded bag-cover, as will be presently explained, and the said platen, together with the bag-cover, may be most conveniently handled during its insertion through the door K by first inserting the parts seen (separately) at Figs. 15 and 16, clasped or held together, and with the folded-in bag-cover confined (at its folded-over portions) between them, and then afterward inserting the parts shown (separated) at Figs. 17 and 18, thus completing the necessary preparations for the final compressing operation. Clutch $i$ should now be closed, and promptly thereafter $s^2$ (for the withdrawal of the knives before the plunger descends against them) and clutch $s^2$ must also be opened promptly as soon as the knives are fully withdrawn. Clutch $g$ may also be closed; but clutch $i$ should be opened as soon as the resistance of the package causes the screw-shaft to rotate with difficulty, when the process of compression should be completed by the rotation of the nut. When the platen carried by the descending plunger reaches the position in the bag-holder O indicated in Fig. 12, the catches $u\ u$ enter recesses in the bag-holder O, so made as to hold the platen securely in that position, and at this time clutch $g$ should be opened and clutch $h$ closed to raise the plunger sufficiently to liberate the compressed package, two or three revolutions being sufficient for that purpose. The doors D D should then be opened and the package withdrawn and placed in the position indicated by Fig. 11 in the supplemental machine, that part of the platen represented by Fig. 18 having first been removed.

As clearly shown in the drawings, (see Figs. 12 to 18, inclusive,) what I have designated as the platen is, in reality, both a platen and a holder for the bag-cover, and is composed of the following named parts or devices, arranged and operating together as follows: R is a plate-like device formed, as shown, (see Figs. 11, 12, and 15,) with an upward central projection, in the top surface of which projection is a slight depression $r^2$, in which is centered the presser-point $m'$ of the supplemental machine when the package is placed therein. Partially around this plate R the bag-cover $r$ is folded, after the fashion indicated at Figs. 12 and 15, and when the last-turned pair of folds in the bag-cover shall have been folded over and down onto the top of plate R, the perforated plate $t$ (see Figs. 11 and 16) is placed on top of the folded-in cover $r$, and is there secured in place by turning outwardly on their pivotal connections two small turn-buttons or fastener devices $r'$, (see Figs. 11 and 15,) which are arranged in recessed portions of the central projection of plate R. The platen proper or follower-plate U is made sufficiently strong, and at the same time comparatively light, by being cast or otherwise formed with depressions $s^4$ or recesses in its top surface, and it is also formed with a central rectangular perforation $u'$ (about equal in size to that in plate $t$) for the accommodation of the central projection of plate R, and also for the reception of the piece marked $v$. (Shown detached at Fig. 18, and assembled at Figs. 12 and 13.) This platen is provided, as shown, with pivoted catches $u$, which engage with depressions on the interior of the frame O of the bag-case to effect the retention of the platen and cover-holder in place, as clearly shown at Fig. 12. The function of the removable piece $v$ is simply to partially fill up the central aperture of the plate U when in place, as seen at Fig. 12, and help to receive and sustain the pressure to which the platen is subjected during the final compression of the contents of the package in the packing-machine. Said piece $v$ when in place is seated upon the rabbets or shoulders formed for its reception in the sides of the central aperture of plate U, and is adapted by means of a slight central depression at $v^5$ (see Fig. 12) to seat the lower end $a^6$ of the screw-shaft A of the packing-machine. By turning the hand-wheel $w$ connected with the tilting lever M, the pivot $m'$ is forced into the central depression $r^2$ of the upwardly-projecting portion of the plate R, whereupon the catches $u\ u$ can be withdrawn from their recesses in the bag-holder, and the rods $l'\ l'$ having been sprung away from the bag-holder, the frame O may be lifted from the package over the end of the tilting lever M, and likewise the parts U and $t$ of the platen represented by Figs. 17 and 16, respectively, all as indicated by Fig. 11, which leaves only the part R of the platen represented by Fig. 15, and the cloth around it on the top of the package. The edges of the cloth being now turned outward, they may be sewed without obstruction to the top of the bag and the package is complete, and is liberated by a reverse turn of the hand-wheel $w$. I provide for rotating the package in this supplemental machine, if desired, for convenience in sewing on the cover between pivot $n$ under the package and pivot $m'$ above it; but this is not essential.

By having a duplicate bag-holder and duplicates of the appliances used in connection therewith, the packer and compressor may be kept constantly at work, pausing only to remove packages and introduce empty bags.

It will be seen that by the use, in the manner described, of the devices R, $t$, U, and $v$ a combined cover-holder and platen is afforded which, while possessing sufficient strength to sustain and transmit to the contents of the bag the screw-pressure employed to effect the final compression of the package of bran, possesses the capacity for a removal of the central device $v$ to permit the insertion through the central aperture of plate U of the holder device $m'$ of the supplemental machine (while the compressed package is still held in confinement by the platen-plate U, locked to the frame O,) and also the disengagement of plate U from the frame O of the package-case is permitted, and the transposition of it and plate $t$ onto the arm M of the supplemental machine (as shown at Fig. 11) while the plate R, under confinement of the holder device $m'$, continues to retain the compressed mass in place in the bag in order that the cover $r$ may be unfolded and securely fastened at its edges or perimeter to the mouth edges of the filled bag. I purposely make the plate R materially smaller in superficial area than the plate $t$, so that in forcing the assembled parts of the platen and cover-holder down during the compression operation and into the engaged or locked condition shown at Fig. 12, the upturned and folded-over edges of portions of the cover $r$ cannot possibly be subjected to any abrasion that might wear, cut, or weaken the said cover.

My object in placing the walls of the packing-case proper D D and D′ D′ in such a position that the plunger as it descends will not come within about a half-inch of their surfaces, is to avoid tearing a bag or other receptacle by the abrasion of the descending column of bran or other material while it is being compressed. I have found that by this arrangement I do not require any metallic plates inside the bag to protect it from abrasion.

The drawings represent the machine as constructed to make square packages of a given height; but packages of less height may be made in the same machine by using shorter rods $l′ l′$, Fig. 14, and putting strips on the inside walls D D and D′ D′ at the top to fill them out above the bag-holders flush with the inside surface of the opening therein. These strips may be put on with screws and removed at pleasure. By a simple method blocks of any thickness may be placed on plate 1 under the bottom of the bag and the rods $l′ l′$ left unchanged.

It is also evident that my invention may be used for forming round or other shaped packages, as well as square packages, by constructing the packing-case of the size and of the shape of the required package and having the walls removable for at least half the distance around the package, with recesses in their opposite sides for the rods $l′ l′$ and for the lugs which these rods connect; also by having a reservoir above said packing-case similar in shape, but always about one inch less in diameter, with the plunger fitting said reservoir. It is also evident that packages may be removed from the packing-case as soon as formed by the process of packing and before being compressed; also that packages may be formed by pressing the material without the use of the auger-like packing devices. I therefore wish it to be distinctly understood that in practicing my invention any one or more of the separable features of the novel machine shown and described may be separately employed and more or less of the fruit of my invention be therefrom derived. Of course many modifications in the details of construction shown and described may be made without departing from the spirit of my invention, and I need hardly add that any such mere modification might be one under which the packing-case and its support might be made vertically movable, while the packing and compressing devices were vertically stationary, in lieu of the reverse order of construction which I have shown and described.

Having now so fully explained the general character of my several features of improvement, and so shown and described the construction of the machine embracing said improvements that those skilled in the art can either wholly or partially practice my invention in one form or another, what I claim as new, and desire to secure by Letters Patent, is—

1. In a machine for packing bran or other material, the combination, with the plunger provided with a helical or auger-like packer, of a device located within said plunger and beneath the helical packer and operating, as specified, to prevent the material from turning or moving helically within the plunger immediately after it leaves the said packer, all substantially in the manner hereinbefore set forth.

2. The combination, with the plunger and the two auger-like packing devices, of a device arranged intermediately of said packing devices and operating, as specified, to prevent any rotatory movement of the material while the latter passes from one to the other of said packing devices, all substantially as hereinbefore set forth.

3. In combination with the packing-case, its upward extension, and suitable means for holding the column of packing material under pressure, the knife-plates, which operate, as specified, to sever the column of material and retain the lower main portion of the column against expansion, all substantially in the manner and for the purpose set forth.

4. The combination of the following-named instrumentalities, arranged and operating in substantially the manner and for the purposes hereinbefore described, viz: first, the packing-case provided with an upward extension; second, the plunger for both packing and pressing the material; third, the knives for severing the column of material while under pressure, and, fourth, the door, located in the upward extension of the packing device to permit the inserting (between the elevated plunger and the top of the severed column of material) of the platen used for pressing the material.

5. The removable combined platen and bag-cover holder provided with means for operating to effect an engagement with the bag-case to hold the filled bag under pressure, and composed of separable parts, some of which may be removed, as specified, from the bag-case, and the remaining parts of which operate, as specified, in conjunction with the bag-case to hold the compressed contents of the bag in place during the necessary operation of securing the cover to the mouth of the bag, all substantially in the manner hereinbefore described.

6. As a means for effecting the retention of the bag in place within the bag receptacle or case during the bag-filling operations, a bag-holder provided with an elastic fillet $o$, over which the mouth of the bag is distended, and means, substantially such as is described, for clamping the bag-mouth against said fillet, all substantially as hereinbefore set forth.

7. A contrivance for holding a filled and packed bag of bran or other material under pressure preparatory to the fastening on of the cover of the bag composed, essentially, of the supporting base-plate 1, provided with the upwardly-projecting rods $l'\ l'$, the skeleton top rim O, and the combined platen and bag-cover holder, adapted to be coupled with and disengaged from said top rim and having its upper plate or portion U perforated, as specified, that part or portion of the combined platen and bag-cover holder which confines the folded-in bag-cover operating also to hold the filled bag under pressure (after the removal of the part U) by the application of power or pressure thereto through the medium of any suitable holder device, (applied to it through the central aperture of the part U before removal of said part,) all substantially as hereinbefore set forth.

8. In a machine for packing bran, a combined platen and bag-cover holder in which the upper plate or portion projects laterally beyond the device which holds the folded-in cover and thus protects the fold-lines or the edges of the folds of said cover against wear by abrasion during the compressing movement of the platen, all substantially as hereinbefore set forth.

In witness whereof I have hereunto set my hand this 12th day of July, A. D. 1889.

SAMUEL T. LOCKWOOD.

In presence of—
    THOMAS C. TEMPLE,
    SAMUEL P. LOCKWOOD.